No. 647,113. Patented Apr. 10, 1900.
E. PHIPPS.
ANTIFRICTION BEARING FOR VEHICLE WHEELS.
(Application filed Mar. 23, 1899.)
(No Model.)
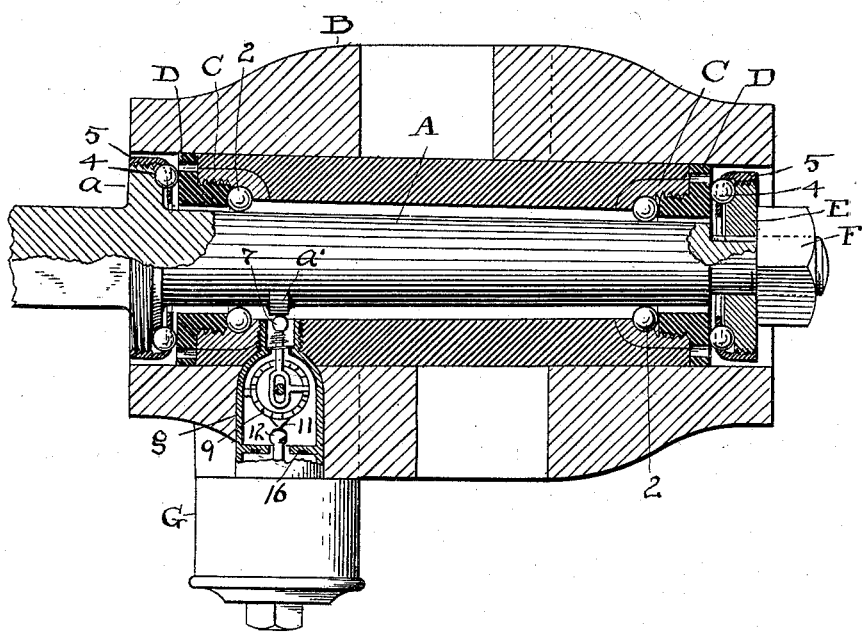
Attest
Inventor
Edward Phipps.
By H. J. Fisher
Atty

UNITED STATES PATENT OFFICE.

EDWARD PHIPPS, OF GLENVILLE, OHIO.

ANTIFRICTION-BEARING FOR VEHICLE-WHEELS.

SPECIFICATION forming part of Letters Patent No. 647,113, dated April 10, 1900.

Application filed March 23, 1899. Serial No. 710,191. (No model.)

*To all whom it may concern:*

Be it known that I, EDWARD PHIPPS, a citizen of the United States, residing at Glenville, in the county of Cuyahoga and State of Ohio, have invented certain new and useful Improvements in Antifriction-Bearings for Vehicle-Wheels; and I do declare that the following is a full, clear, and exact description of the invention, which will enable others skilled in the art to which it appertains to make and use the same.

My invention relates to antifriction-bearings for vehicle-wheels; and the invention consists in the construction and combination of parts, substantially as shown and described, and particularly pointed out in the claims.

In the accompanying drawing the figure is a longitudinal sectional elevation of my improved bearing, with the oiling mechanism partly in section.

First, in reference to the bearing, it will be noticed that I provide for both a pressure-bearing, such as is incident to all wheels, and an endwise or thrust bearing, so that in both relations and places there are antifriction-balls to sustain the pressure. To these ends I employ what may be regarded as an ordinary wheel-axle spindle A, with a flange $a$ at the base of the spindle.

B is the wheel-hub, and 2 are a series of antifriction-bearing balls within the hub at each end and arranged in a circle around the spindle to take the weight-pressure of the vehicle. A cup C, of suitable hardened metal to form the bearing, is located in each end of the inner supporting member of the hub, and the balls 2 run in the concavity thereof and are confined by a threaded and outwardly-flanged ring D, the said ring engaging with its thread in the outer and wider portion of the cup C, and the bearing of the ball 2, therefore, is between the bottom of the cup and the ring D as to its sides, and of course upon the spindle A, and in this respect the hub B at both ends and the corresponding series of balls 2 are alike. The end thrust of the wheel is taken up by the antifriction-balls 4, which run in an annular groove on the inside of the flange $a$ of the axle-spindle, wherein they are retained by a retaining-cap 5, and projecting through said cap take their hub-bearing upon the outer surface of the ring D. At the front of the axle-spindle, there being no flange $a$, a washer E is inserted next to the confining-nut F on the end of the spindle, and a retaining-cap 5 for the balls 4 is employed here the same as at the rear, the cap 5 being threaded upon the washer E as it is threaded upon the flange A at the base of the spindle.

What I claim is—

1. The wheel-hub having hardened substantially cup-shaped bearings in its ends, and balls and a ball-confining ring removably mounted within the ends of said cups, in combination with an axle-spindle having a flange and balls about said flange bearing against said rings, and a ball-retainer removably mounted upon said flange to keep the balls in place when the hub is removed, and a ball-bearing washer at the end of the spindle, substantially as described.

2. An antifriction-hub for vehicle-wheels, in combination with an axle-spindle having a flange, balls mounted about said flange, and a ball-retaining cap removably fastened to said flange to keep the balls in place when the hub is removed, and a washer for the end of the spindle, balls about the inner face of said washer, and a removable retaining-cap fastened to said washer to keep the balls in place when the washer is removed, said ball-bearing flange and washer forming end-thrust bearings for said hub, substantially as described.

3. The wheel-hub and the hardened cup-shaped bearings in each end, balls 2 and confining-rings D for said cups, in combination with an axle-spindle having a flange $a$, balls 4 and ball-retaining cap 5 adjacent to one of said rings, and a washer E, balls and a removable ball-retaining cap adjacent to the other ring, these parts forming end-thrust bearings for said hub, substantially as described.

Witness my hand to the foregoing specification this 14th day of March, 1899.

EDWARD PHIPPS.

Witnesses:
H. E. MUDRA,
R. B. MOSER.